(12) United States Patent
Nakata et al.

(10) Patent No.: US 10,178,319 B2
(45) Date of Patent: Jan. 8, 2019

(54) IMAGING APPARATUS, CAMERA SYSTEM AND SIGNAL OUTPUT METHOD

(71) Applicant: KYOCERA Corporation, Kyoto (JP)

(72) Inventors: Takatoshi Nakata, Yokohama (JP); Tomoo Nishino, Yokohama (JP); Mizuki Suzumura, Tokyo (JP); Hidetoshi Umeda, Esslinger (DE); Tadashi Yokota, Yamato (JP)

(73) Assignee: KYOCERA Corporation, Kyoto (JP)

( * ) Notice: Subject to any disclaimer, the term of this patent is extended or adjusted under 35 U.S.C. 154(b) by 54 days.

(21) Appl. No.: 15/114,418

(22) PCT Filed: Jan. 29, 2015

(86) PCT No.: PCT/JP2015/000404
§ 371 (c)(1),
(2) Date: Jul. 27, 2016

(87) PCT Pub. No.: WO2015/115104
PCT Pub. Date: Aug. 6, 2015

(65) Prior Publication Data
US 2016/0344936 A1    Nov. 24, 2016

(30) Foreign Application Priority Data

Jan. 29, 2014 (JP) ................... 2014-014925

(51) Int. Cl.
H04N 5/232 (2006.01)
H04N 5/378 (2011.01)
(Continued)

(52) U.S. Cl.
CPC ..... *H04N 5/23293* (2013.01); *G06K 9/00805* (2013.01); *H04N 5/374* (2013.01); *H04N 5/378* (2013.01)

(58) Field of Classification Search
None
See application file for complete search history.

(56) References Cited

U.S. PATENT DOCUMENTS

| 7,847,830 B2 | 12/2010 | Rogers et al. |
| 2006/0028542 A1* | 2/2006 | Rondinelli ......... H04N 5/23238 348/36 |

(Continued)

FOREIGN PATENT DOCUMENTS

| JP | 2009-217073 A | 9/2009 |
| JP | 2010-068030 | 3/2010 |

(Continued)

OTHER PUBLICATIONS

Extended European Search Report issued by the European Patent Office dated Jul. 3, 2017, which corresponds to EP15743443.2-1902 and is related to U.S. Appl. No. 15/114,418.

(Continued)

*Primary Examiner* — Eileen M Adams
(74) *Attorney, Agent, or Firm* — Studebaker & Brackett PC

(57) ABSTRACT

An imaging apparatus capable of outputting pixel signals to one or more output destinations includes an imager having a plurality of pixels that are arrayed two-dimensionally and respectively can generate pixel signals; an identifier adding unit configured to add an identifier associated with at least one output destination to each of pixel signals of at least a part of pixels among the plurality of pixels and an image processing unit configured to output each of the pixel signals to an output destination that corresponds to an identifier included in each of the pixel signals.

7 Claims, 3 Drawing Sheets

(51) Int. Cl.
  *G06K 9/00*   (2006.01)
  *H04N 5/374*  (2011.01)

(56) References Cited

U.S. PATENT DOCUMENTS

| | | |
|---|---|---|
| 2007/0195182 A1 | 8/2007 | Ito |
| 2008/0117305 A1* | 5/2008 | Rogers .................... G03B 7/08 348/222.1 |
| 2009/0040344 A1 | 2/2009 | Hirose |
| 2011/0102454 A1 | 5/2011 | Miyakoshi et al. |
| 2011/0317154 A1* | 12/2011 | Tan ........................ G01B 11/03 356/139.03 |

FOREIGN PATENT DOCUMENTS

| | | |
|---|---|---|
| JP | 2010-510717 A | 4/2010 |
| JP | 2011-004193 A | 1/2011 |

OTHER PUBLICATIONS

International Search Report issued in PCT/JP2015/000404; dated Apr. 28, 2015.

Written Opinion issued in PCT/JP2015/000404; dated Apr. 28, 2015; with English language Concise Explanation.

\* cited by examiner

IMAGING APPARATUS, CAMERA SYSTEM AND SIGNAL OUTPUT METHOD

CROSS-REFERENCE TO RELATED APPLICATIONS

This application claims priority to and the benefit of Japanese Patent Application No. 2014-014925 filed on Jan. 29, 2014 and PCT Application No. PCT/JP2015/000404 filed on Jan. 29, 2015, the entire contents of which are incorporated herein by reference.

TECHNICAL FIELD

This disclosure relates to an imaging apparatus that outputs an image to one or more output destinations, a camera system and a signal output method.

BACKGROUND

An imaging apparatus that outputs the image data of an object has been known. For example, PTL 1 describes a technique in which the data of image output from an imager such as a CCD, or the like, to which the predetermined image processing is applied is stored in a frame memory, the stored image data is output to a plurality of systems, and the predetermined processing such as, for example, display and output of an image, face detection of an object and calculation of luminance, or the like, is performed.

CITATION LIST

Patent Literature

PTL 1: JP2016-068030 (A)

SUMMARY

Technical Problem

However, when the image data is output to a plurality of output destinations, for example, it is necessary to temporarily store the image data in a frame memory, thus the storage and readout processing of the image data occurs, and as a result, the processing time is increased. Furthermore, as the resolution required for the image data increases, there is a further increase in the processing time and a larger frame memory capacity is required, and as a result, cost is increased.

It would therefore be helpful to provide an imaging apparatus that outputs an image to one or more output destinations with reduced processing burden, a camera system and a signal output method.

An imaging apparatus according to this disclosure is an imaging apparatus capable of outputting pixel signals to one or more output destinations, the imaging apparatus includes:
- an imager having a plurality of pixels that are arrayed two-dimensionally and respectively can generate pixel signals;
- an identifier adding unit configured to add an identifier associated with at least one output destination to the pixel signals of at least a part of pixels among the plurality of pixels; and
- an image processing unit configured to output each of the pixel signals to an output destination that corresponds to the identifier included in the each of the pixel signals.

Furthermore, a camera system according to this disclosure includes:
- an imaging apparatus having an imager having a plurality of pixels that are arrayed two-dimensionally and respectively can generate pixel signals, an identifier adding unit configured to add an identifier associated with at least one output destination to the pixel signals of at least a part of pixels among the plurality of pixels, and an image processing unit configured to output each of the pixel signals to an output destination that corresponds to the identifier included in the each of the pixel signals; and
- an apparatus that is defined as the output destination and to which the pixel signals output by the imaging apparatus are input.

Moreover, a signal output method according to this disclosure includes the steps of:
- causing a plurality of pixels arrayed two-dimensionally to respectively generate pixel signals;
- adding an identifier associated with at least one output destination to the pixel signals of at least a part of pixels among the plurality of pixels; and
- outputting each of the pixel signals to an output destination that corresponds to the identifier included in the each of the pixel signals.

Advantageous Effect

According to an imaging apparatus, a camera system and a signal output method of this disclosure, an image can be output to one or more output destinations with reduced processing burden.

DETAILED DESCRIPTION

An embodiment of this disclosure will be described below with reference to the drawings.

First, a camera system and an imaging apparatus according to one embodiment of this discloser are described.

Figure 1:
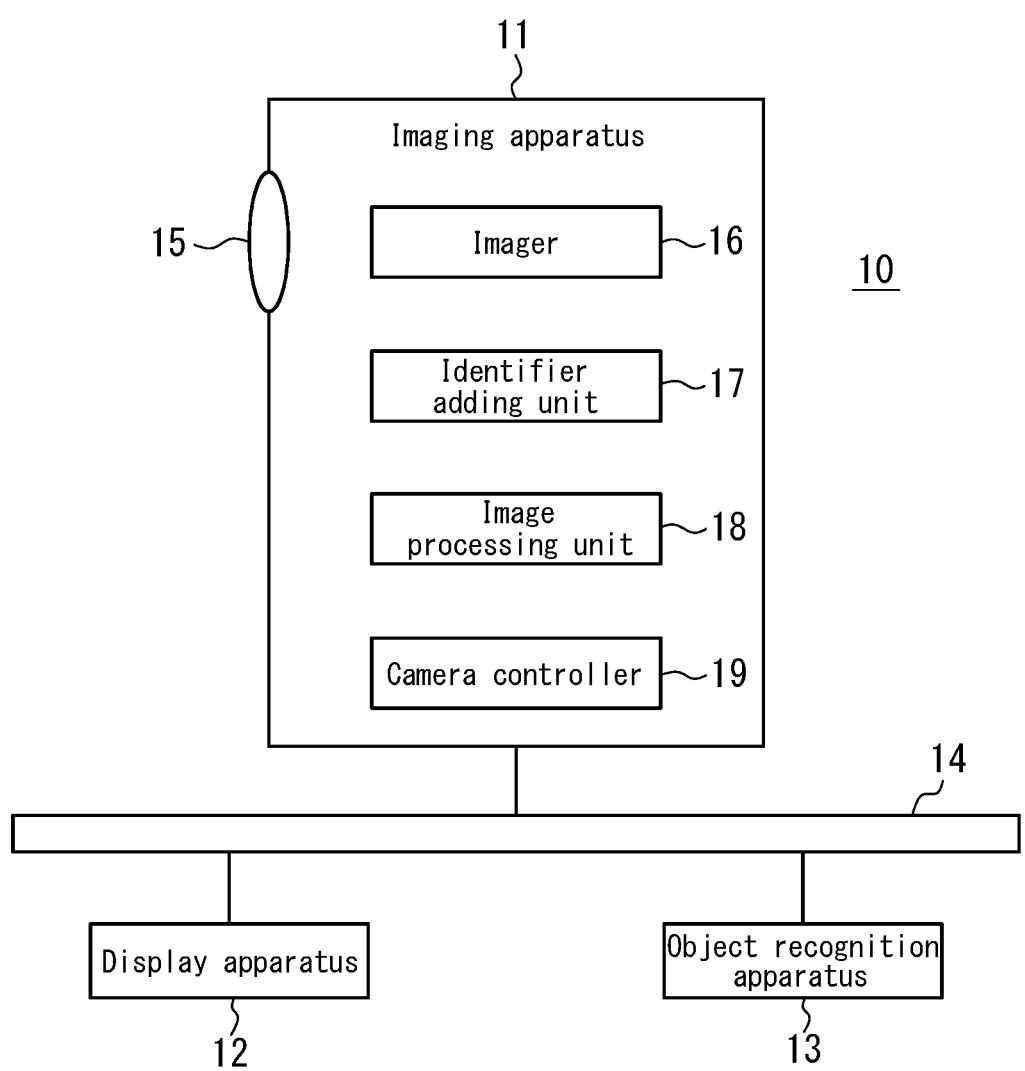
FIG. 1 is a block diagram illustrating a schematic configuration of a camera system according to one embodiment of this disclosure.

As illustrated in FIG. 1, a camera system 10 includes an imaging apparatus 11, a display apparatus 12 and an object recognition apparatus 13. In this embodiment, although the imaging apparatus 11 is, for example, a front camera disposed on the front unit of a moving object, such as a vehicle, it can be other cameras, such as a rear camera disposed on the rear unit thereof. The camera system 10 may also include a plurality of imaging apparatuses 11, such as, for example, a front camera, a rear camera and side cameras. Each component of the camera system 10 can transmit/receive the information via an exclusive line or a vehicle-mounted network, such as, for example, a CAN, or the like. In this embodiment, the display apparatus 12 and the object recognition apparatus 13 are defined as an output destination of a pixel signal by the imaging apparatus 11.

The imaging apparatus 11 includes an optical system 15, an imager 16, an identifier adding unit 17, an image processing unit 18 and a camera controller 19.

The optical system 15 is configured by including an aperture and a plurality of lenses, and forms an object image. In this embodiment, the optical system 15 has a wide angle of view, and can form an image of an object included in the area around the moving object.

The imager 16 is, for example, a CMOS imager, has a plurality of pixels arrayed two-dimensionally and captures an image of an object formed by the optical system 15. That is, by capturing an image, a pixel signal corresponding to the light receiving amount of each pixel is generated. The imager 16 also outputs pixel signals generated respectively by a plurality of pixels to the identifier adding unit 17 by capturing an image. Pixel signals are used for generating images (image signals), and one image signal is composed of a plurality of pixel signals.

The identifier adding unit 17 can sequentially acquire pixel signals from the imager 16 with respect to each pixel. The identifier adding unit 17 adds a predetermined identifier to pixel signals of at least a part of pixels based on a clock signal and a synchronization signal, and outputs the signals to an image processing unit 18. The predetermined identifier is associated with an output destination of the pixel signal to which the identifier is added. In this embodiment, an identifier is associated with either one of the display apparatus 12 and the object recognition apparatus 13 or both of them. In order to add an identifier, the identifier adding unit 17 stores the information of association indicating the association between pixels arrayed two-dimensionally in a predetermined area and an identifier. For example, the information of association is a table or a map in which an address of a pixel within a predetermined area is associated with an identifier to be added to a pixel signal of the pixel. The identifier adding unit 17 adds an identifier to a pixel signal of each pixel based on the information of association. The information of association may be predefined when manufacturing the imaging apparatus 11, for example, and may be changed by a user, or the like.

Figure 2:
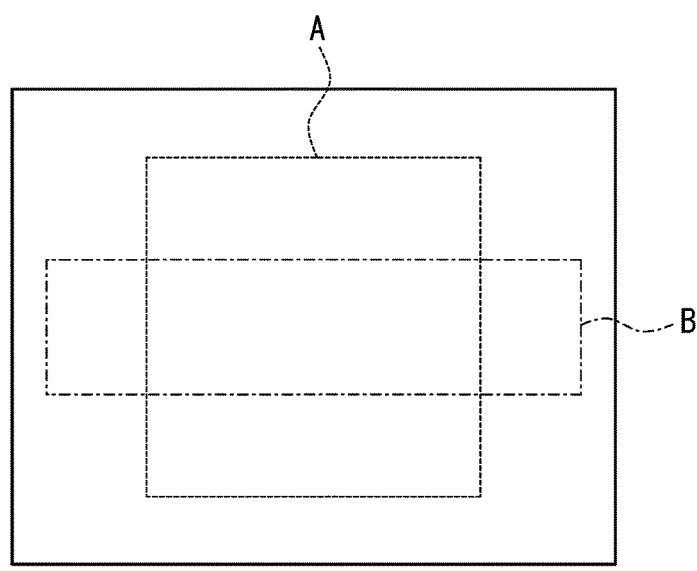
FIG. 2 is a diagram illustrating a light receiving plane of an imager illustrated in FIG. 1.

Here, the information of association stored in the identifier adding unit 17 is described with reference to FIG. 2. In this embodiment, the first area A illustrated in FIG. 2 is defined as an image area to be displayed by the display apparatus 12 (the first output destination). Furthermore, the second area B is defined as an image area to which the object recognition apparatus 13 (a second output destination) executes the object recognition processing. The area A and the area B may be duplicated one another or separated one another.

When the identifier adding unit 17 acquires a pixel signal of a pixel included in the area A, it adds an identifier (for example, the identifier A) associated with the display apparatus 12 to the pixel signal. When the identifier adding unit 17 acquires a pixel signal of a pixel included in the area B, it adds an identifier (for example, the identifier B) associated with the object recognition apparatus 13 to the pixel signal.

The image processing unit 18 acquires pixel signals from the identifier adding unit 17. The image processing unit 18 applies a general image processing such as denoising, color interpolation, brightness correction, color correction, gamma correction, or the like, to an image signal composed of a plurality of pixel signals acquired. The image processing unit 18 also allocates a pixel signal of a pixel to an output destination that corresponds to an identifier added to the pixel signal of the pixel and outputs the pixel signal.

Furthermore, the image processing unit 18 may discard pixel signals other than those to which an identifier is added without outputting them.

The camera controller 19 controls operation of each unit of the imaging apparatus 11. For example, the camera controller 19 controls operation of the imager 16 and the image processing unit 18, and causes them to periodically output a pixel signal at 30 fps, for example.

The display apparatus 12 is configured by including a LCD (liquid crystal display), for example, and can display moving images in real time. The display apparatus 12 displays an image composed of pixel signals of a plurality of pixels (for example, pixel signals of the pixels included in the area A illustrated in FIG. 2) input from the image processing unit 18. The display apparatus 12 may function as an interface that is configured as a touch panel, for example, and accepts user operation.

The object recognition apparatus 13 (see FIG. 1) performs recognition processing of a predetermined object such as an obstacle, or the like, by using an image composed of pixel signals of a plurality of pixels (e.g. pixel signals of pixels included in the area B illustrated in FIG. 2) input from the image processing unit 18. Recognition of an object is performed by using a general object recognition technique, such as, for example, the pattern recognition, or the like.

Figure 3:
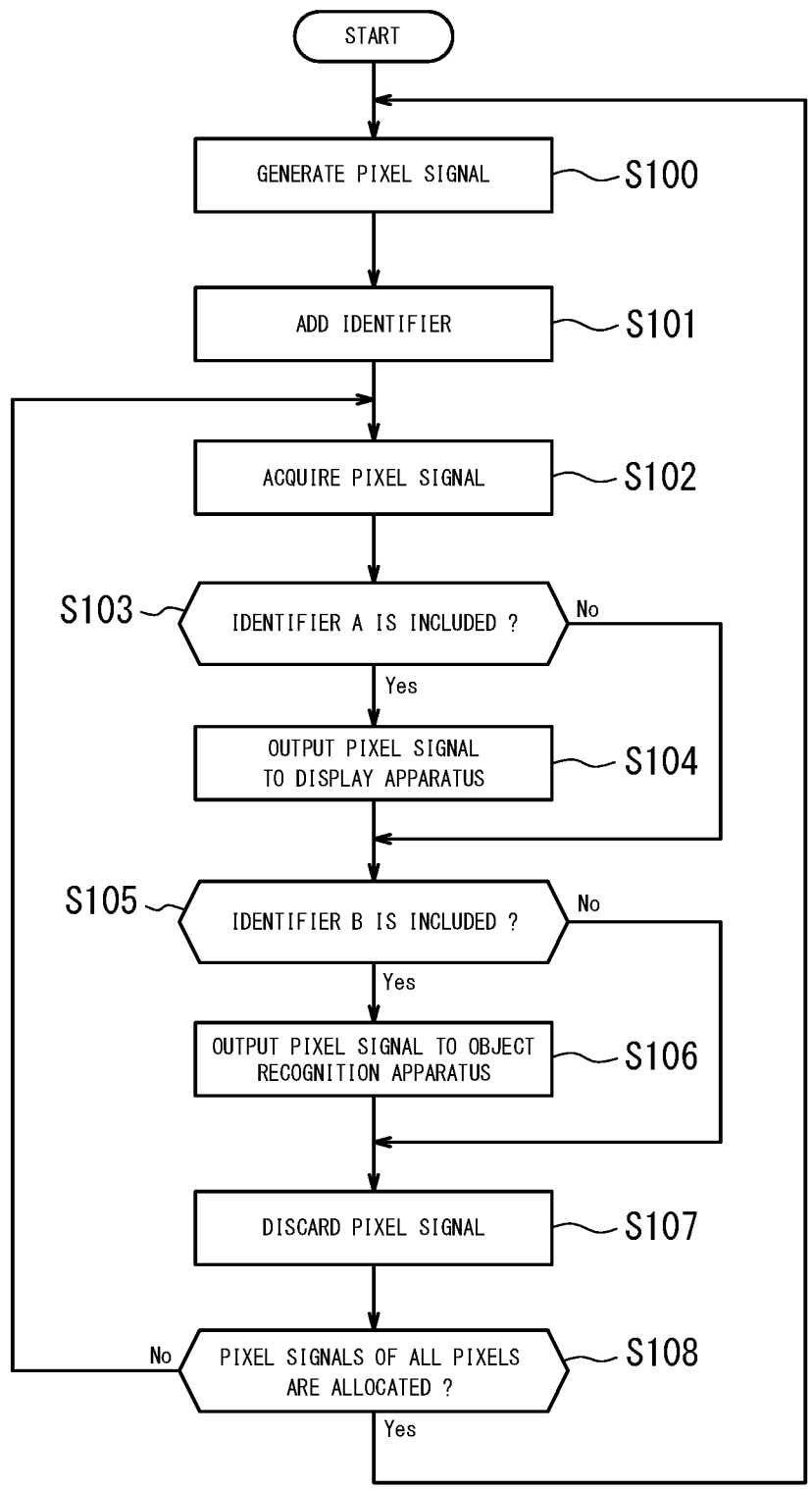
FIG. 3 is a flowchart illustrating an operation of an imaging apparatus illustrated in FIG. 1.

Next, the processing in which the imaging apparatus 11 according to this embodiment allocates a pixel signal and outputs it to an output destination will be described with reference to the flowchart illustrated in FIG. 3. This processing is started when an operator starts a moving object, for example, and is executed repeatedly until the operator instructs to terminate the processing. The processing below describes an operation of the imaging apparatus 11 in one frame.

First, in step S100, the imager 16 of the imaging apparatus 11 captures an image of an object around a moving object to generate pixel signals of each pixel and outputs them to the identifier adding unit 17.

Next, in step S101, based on the previously stored information of association, the identifier adding unit 17 adds an identifier to at least a part of pixel signals among a plurality of pixel signals acquired from the imager 16 in the step S100. In this embodiment, the identifier adding unit 17 adds an identifier A to the pixel signals of the pixels in the area A illustrated in FIG. 2. The identifier adding unit 17 also adds an identifier B to the pixel signals of the pixels in the area B.

Next, in step S102, the image processing unit 18 acquires a pixel signal of one pixel from the identifier adding unit 17.

Subsequently, in step S103, the image processing unit 18 determines whether or not the pixel signal acquired in the step S102 includes an identifier A.

If an identifier A is included in the step S103 (Yes in the step S103), in step S104, the image processing unit 18 outputs the pixel signal acquired in the step S102 to the display apparatus 12.

After the step S104 or if an identifier A is not included in the step S103 (No in the step S103), in step S105, the image processing unit 18 determines whether or not the pixel signal acquired in the step S103 includes an identifier B.

If an identifier B is included in the step S105 (Yes in the step S105), in step S106, the image processing unit 18 outputs the pixel signal acquired in the step S102 to the object recognition apparatus 13.

After the step S106 or if an identifier B is not included in the step S105 (No in the step S105), in step S107, the image processing unit 18 discards the pixel signal acquired in the step S102.

Subsequently, in step S108, the image processing unit 18 determines whether or not pixel signals of all pixels in the current frame have been allocated. If the pixel signals of all pixels have been allocated (Yes in the step S108), the process returns to the step S100 to perform the same processing with respect to the next frame. On the other hand, if the pixel signals of all pixels have not been allocated (No in the step S108), the image processing unit 18 executes the processing from the step S102 to S108 repeatedly with respect to the pixel signals of the pixels not allocated.

Thus, according to the imaging apparatus 11 of the camera system 10 of this embodiment, an identifier is added to a pixel signal of a pixel, and the pixel signal is allocated according to the identifier, and thus it is not needed to store an image in a frame memory. As a result of this, the processing burden of outputting a plurality of pixel signals, as an image, to an output destination is reduced. Furthermore, since it is not necessary for the imaging apparatus 11 to be provided with a frame memory, the cost of the imaging apparatus 11 can be reduced. Moreover, the frame delay caused by storage of images in a frame memory is reduced.

As explained below, the camera system 10 according to this embodiment is particularly useful when pixel signals are output to two or more output destinations whose corresponding areas in which a plurality of pixels defined with respect to each output destination are arrayed two-dimensionally are different from each other. In the case of a configuration in which an image is stored in a frame memory, an image retrieved from a frame memory is needed to be undergone trimming processing that differs according to the output destination. That is, as the number of output destinations whose corresponding defined areas are different from each other increases, the processing burden increases. In this regard, even if there are two or more output destinations whose corresponding areas in which a plurality of pixels defined with respect to output destination are arrayed two-dimensionally are different from each other, the imaging apparatus 11 according to this embodiment does not require any additional processing except for the above-described processing in which output of a pixel signal is allocated based on an identifier. As a result of this, regardless of the number of output destinations whose corresponding areas in which a plurality of pixels are arrayed two-dimensionally are different from each other, the processing burden of outputting a pixel signal, as an image, to a plurality of output destinations is reduced.

Furthermore, the camera system 10 according to this embodiment discards pixel signals other than those to which an identifier is added without outputting them, thus as a result, the amount of data to be handled is reduced, and the processing burden is further reduced.

Although this disclosure is described based on drawings and an embodiment, it is to be noted that various changes and modifications will be easy for those skilled in the art based on this disclosure. Therefore, such changes and modifications are to be understood to be included within the scope of this disclosure.

Moreover, components of the camera system 10 of the above-described embodiment can be divided and rearranged. For example, the imaging apparatus 11 may be configured to have a display having the same function as that of the display apparatus 12 and an object recognition unit having the same function as that of the object recognition apparatus 13. Furthermore, the image processing unit 18 may have each function of the identifier adding unit 17 of the imaging apparatus 11. In addition, other than a camera system, this apparatus may be any imaging system that outputs pixel signals to a plurality of systems.

In the above-described embodiment, although the imager 16 is explained as a CMOS sensor, it may be other types of imager, such as a CCD sensor, or the like.

In the above-described embodiment, other than an identifier associated with each output destination, the identifier adding unit 17 may add an identifier that allows a pixel signal to be discarded. In this case, if an acquired pixel signal includes an identifier to allow discard, the image processing unit 18 discards a pixel signal without outputting it.

A part of the components of the camera system 10 according to the above-described embodiment may be disposed outside a moving object. For example, the imaging apparatus 11, or the like, is realized as a communication apparatus such as a mobile phone, or the like, and can be connected to other components of the camera system 10 wired or wirelessly.

REFERENCE SIGNS LIST

10 Camera system
11 Imaging apparatus
12 Display apparatus
13 Object recognition apparatus
14 Vehicle-mounted network
15 Optical system
16 Imager
17 Identifier adding unit
18 Image processing unit
19 Camera controller

The invention claimed is:

1. An imaging apparatus capable of outputting pixel signals to one or more output destinations; comprising:
    an imager having a plurality of pixels that are arrayed in two-dimension and respectively can generate pixel signals;
    an identifier adding unit configured to store information indicating a predefined association between pixels in a predetermined area that includes a part of the plurality of pixels of the imager which are arrayed in two-dimension and an identifier associated with at least one output destination to which the pixel signals of the pixels in the predetermined area are output and to add the identifier to the pixel signals of the pixels located in the predetermined area based on the stored information; and
    an image processing unit configured to output each of the pixel signals to the output destination associated with the identifier included in the each of the pixel signals.

2. The imaging apparatus according to claim 1, wherein the identifier adding unit adds the identifier associated with a first output destination to the pixel signals of pixels located in a first area which includes a part of the plurality of pixels arrayed in two-dimension, and the identifier associated with a second output destination to the pixel signals of pixels located in a second area which includes a part of the plurality of pixels arrayed in two-dimension.

3. The imaging apparatus according to claim 1, wherein the image processing unit discards, except for the pixel signals to which the identifier is added, the pixel signals without outputting them.

4. The imaging apparatus according to claim 1, further comprising a display configured to display an image based on the plurality of pixel signals acquired from the image processing unit, the display being defined as the output destination.

5. The imaging apparatus according to claim 1, further comprising an object recognition unit configured to perform object recognition based on the plurality of pixel signals acquired from the image processing unit, the object recognition unit being defined as the output destination.

6. A camera system, comprising:
an imaging apparatus including an imager having a plurality of pixels that are arrayed two-dimensionally and respectively can generate pixel signals, an identifier adding unit configured to store information indicating a predefined association between pixels in a predetermined area that includes a part of the plurality of pixels of the imager which are arrayed in two-dimension and an identifier associated with at least one output destination to which the pixel signals of the pixels in the predetermined area are output and to add the identifier to the pixel signals of the pixels located in the predetermined area based on the stored information, and an image processing unit configured to output each of the pixel signals to the output destination corresponding to the identifier included in the each of the pixel signals; and
an apparatus to which the pixel signals output by the imaging apparatus are input, the apparatus being defined as the output destination.

7. A signal output method, comprising the steps of:
causing each of a plurality of pixels of an imager, that are arrayed two-dimensionally to generate pixel signals;
storing information indicating a predefined association between pixels in a predetermined area that includes a part of the plurality of pixels of the imager which are arrayed in two-dimension and an identifier associated with at least one output destination to which the pixel signals of the pixels in the predetermined area are output and adding the identifier to the pixel signals of the pixels located in the predetermined area based on the stored information; and
outputting each of the pixel signals to- the output destination corresponding to the identifier included in the each of the pixel signals.

* * * * *